March 10, 1925.　　　　　　　　　　　　　　　1,529,138
C. KUENTZEL
SUPPORTING MECHANISM
Filed June 9, 1922　　　2 Sheets-Sheet 1

Inventor:
CURT KUENTZEL.
By Hazard & Miller
Attorneys

March 10, 1925.  1,529,138

C. KUENTZEL

SUPPORTING MECHANISM

Filed June 9, 1922  2 Sheets-Sheet 2

Inventor
CURT KUENTZEL
BY Hazard and Miller
Attorneys

Patented Mar. 10, 1925.

1,529,138

UNITED STATES PATENT OFFICE.

CURT KUENTZEL, OF SAN MATEO, CALIFORNIA, ASSIGNOR TO UNITED AIR SPRING COMPANY OF ARIZONA, OF PHOENIX, ARIZONA, A CORPORATION OF ARIZONA.

SUPPORTING MECHANISM.

Application filed June 9, 1922. Serial No. 566,985.

*To all whom it may concern:*

Be it known that I, CURT KUENTZEL, a citizen of the United States, residing at San Mateo, in the county of San Mateo and State of California, have invented new and useful Improvements in Supporting Mechanisms, of which the following is a specification.

This invention relates to supporting mechanism for various movable structures, such for instance as vehicle seats and platforms and other parts which it is desired to mount so as to have a free movement in a substantially vertical plane without rocking or tilting.

It is one of the objects of the present invention to provide a simple, substantial, practicable and inexpensive form of mechanically operative mounting for vehicle seats, and which mounting will so operate as to provide for a yielding or cushioning action of the seat by movement in parallel positions.

Other objects will be made manifest in the following specification of an embodiment of the invention illustrated in the accompanying drawings, in which—

While my present invention is designed to be utilized in combination with various objects which it is desired to mount for a yielding up and down action, the mounting in the present case is shown as combined with a seat structure having a pneumatic cushion, such for instance as is illustrated in U. S. Letters Patent No. 1,288,447, dated Dec. 17, 1918, to Henry Seibel.

The present mechanical form of mounting is designed to provide means for controlling the movement of the chair or seat when the pneumatic cushion thereof yields under a load imposed upon the seat.

Figure 1:
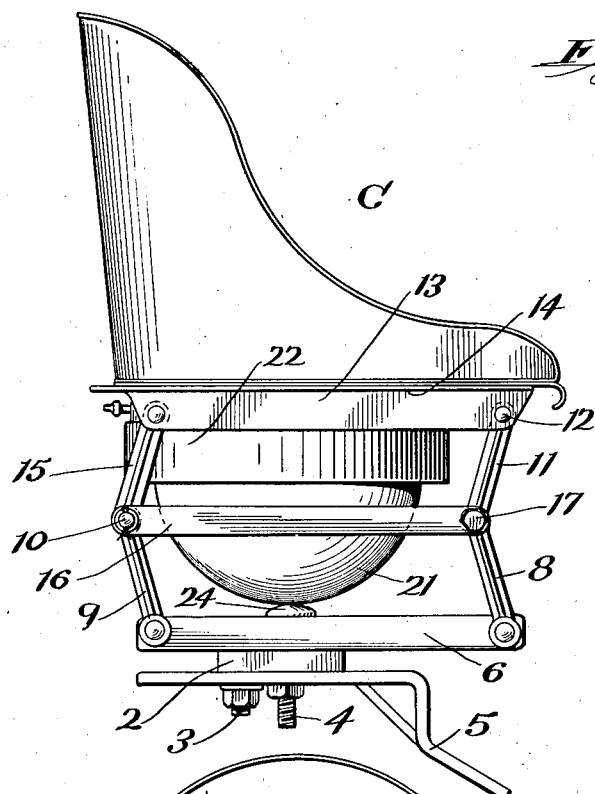
Figure 1 is a side elevation of the mounting as adapted for supporting a chair or seat.
Figure 2:
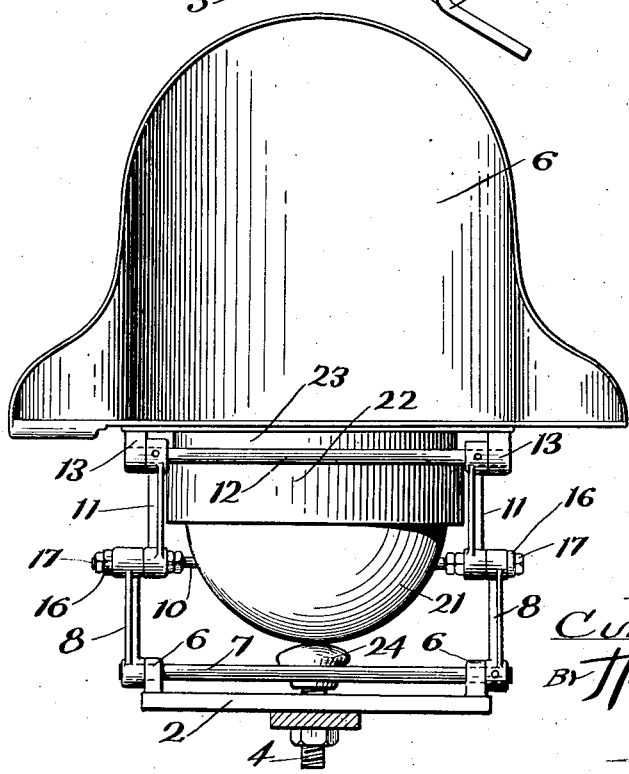
Fig. 2 is a front elevation of the device.
Figure 3:
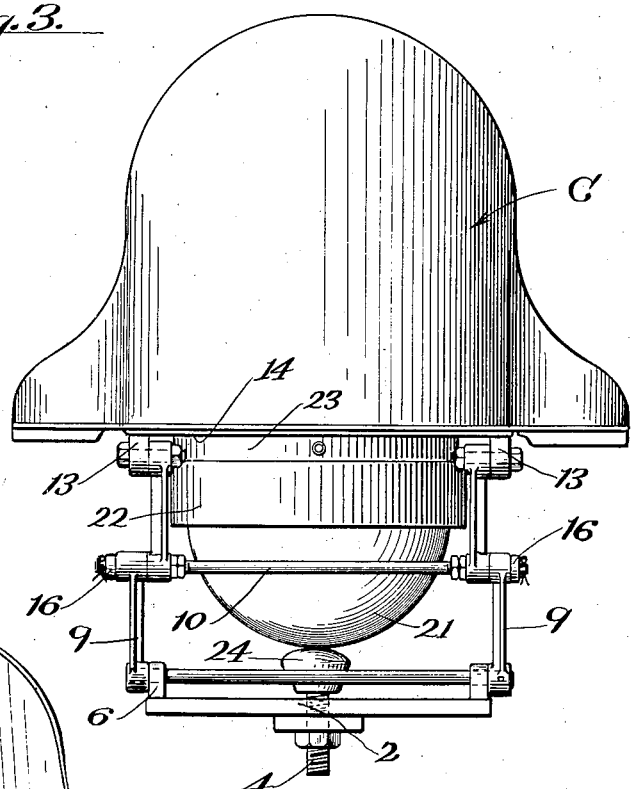
Fig. 3 is a rear elevation.
Figure 4:
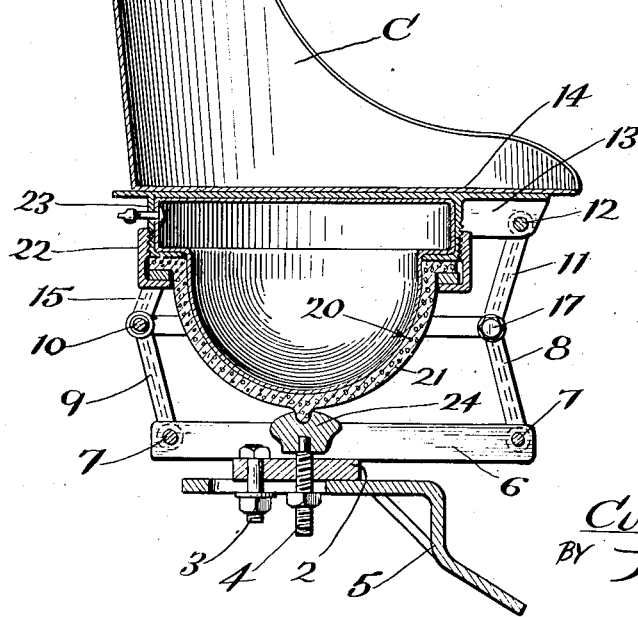
Fig. 4 is a vertical section from front to rear of the device and a pneumatic cushion for the seat.

A preferred form of the mechanical support or mounting consists of a simple main beam or plate member 2 provided with means as adjusting bolts 3 and 4 for connecting it securely upon any primary support, such for instance as a seat bracket or arm 5 of any vehicle, such for instance as an agricultural implement. The screw 4 with the abutment 24 provides for the raising or lowering of the seat frame with respect to the primary support or bracket 5. The base plate 2 is designed to be arranged transversely upon the bracket arm 5, and at the ends of the plate are provided side bars 6 of suitable dimensions, and in the forward and rear ends of the pair of side bars are journaled a transverse pair of parallel pivot rods 7 which are shown in Figs. 2 and 3 as extending through the side bars 6 and carrying on their outer extremities sets of radius arms or cranks.

The front set of cranks is indicated at 8 and the rear cranks at 9. These extend upwardly and the rear set is connected, at the outer swinging ends, by a transverse tie rod 10. The arms 8 and 9 are of substantially equal length and the front arms are pivotally connected to upwardly extending links 11 mounted upon a transverse shaft or supporting rod 12 which is mounted in downwardly projecting flanges 13 formed or provided upon a bench structure 14. The swinging ends of the rear arms 9, which carry the transverse tie rod 10, are pivotally connected to upwardly extending links 15, and these are pivotally connected to the rear ends of the flanges 13 of the bench or supporting device 14.

To provide for a positive concurrent and uniform action of the sets of links and cranks, these are interconnected by parallel forwardly and rearwardly extending side links 16, the rear ends of which are mounted on the transverse tie rod 10, while the front ends are connected to the contiguous ends of the cranks 8 and links 11 by pivot forming bolts 17.

From the above it will be seen that this type of carrier or mounting provides for movement of the bench part 14 from one position to another in parallel relation with respect to the fixed side bars 6.

The specific form of yielding support for carrying a chair or seat C may be varied according to the use of the apparatus, but a form of cushion is here shown as comprising a pneumatic structure including an inflated bag 20 positioned beneath the top of the bench 14 and extending down into a hemispherical chamber 21 which may be attached as by means of a collar 22 to a threaded flange 23 provided on the bottom of the bench. The bottom of the chamber 21 engages an abutment 24.

In operation of the present mechanical mounting, when a load is imposed upon a bench or carrying part 14, this latter will yield subject to the cushion resistance afforded by the pneumatic bag 20 which is contained in the chamber 21. This chamber or casing is preferably made of flexible material and will therefore cave in under resistance of the abutment 24 as the chair structure moves downwardly toward the abutment.

From the above it will be seen that this mechanical movement prevents any rocking or tilting of the chair and enables it to move only from one position to another parallel to it.

Various modifications and changes may be resorted to within the spirit of the invention as claimed.

What is claimed is:

1. In combination, a primary support, a plate horizontally adjustable on said support, side bars attached to the plate and carrying a parallel link, a seat frame having a seat, said seat having a ring flange, a flexible chamber secured to said ring flange, a pneumatic cushion bag engaging the bottom of the seat and fitting the ring flange and the chamber, and means engaging said chamber for vertically adjusting said chamber and seat in relation to said plate and said side bars.

2. In combination, a primary support, a plate horizontally adjustable on said support, side bars attached to said plate and carrying a parallel link, a seat frame having a seat, said seat having a threaded ring flange, a substantially hemispherical flexible chamber, a collar screw threaded to said ring flange for securing said chamber in position, a pneumatic cushion bag engaging the bottom of the seat and fitting the ring flange and the chamber, and means engaging said chamber for vertically adjusting said chamber and seat in relation to the said plate and said side bars.

In testimony whereof I have signed my name to this specification.

CURT KUENTZEL.